Oct. 6, 1931.  H. A. LOCKWOOD  1,826,080

BAKING PAN UNIT

Filed April 10, 1930

Inventor
Harry A. Lockwood

By Murray and Bugelter
Attorneys

Patented Oct. 6, 1931

1,826,080

UNITED STATES PATENT OFFICE

HARRY A. LOCKWOOD, OF CINCINNATI, OHIO, ASSIGNOR TO THE LOCKWOOD MANUFACTURING COMPANY, OF CINCINNATI, OHIO, A CORPORATION OF OHIO

BAKING PAN UNIT

Application filed April 10, 1930. Serial No. 443,058.

This invention relates to baking pan units comprising individual pans secured together in spaced relationship and adapted to be nested with or stacked upon similar pans or units.

An object of the invention is to provide means for precluding scratching or wearing away of the plating on the inner surfaces of baking pans when the pan units are nested or stacked upon one another.

Another object is to provide means for accomplishing the above, which means is disposed entirely without the pan interiors when the units are nested.

Another object is to provide a means for the purpose stated, which is simple and inexpensive of manufacture.

These and other objects are attained by the means described herein and disclosed in the accompanying drawings, in which.

Figure 1:
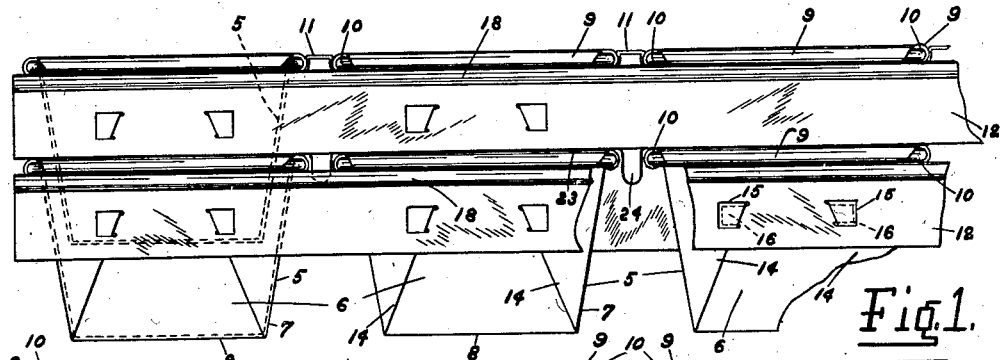
Fig. 1 is a side elevational view of a pair of nested pan units embodying the invention, part thereof being broken away.

The individual pans 5 are of the usual construction, each. having end walls 6 and side walls 7 flaring outwardly from the bottom 8. The uppermost edges of the side and end walls of each pan are developed to provide beads 9 which are turned upon the reinforcing members or wires 10 surrounding each pan near its top edges. The pans may be of the folded end type shown in the drawings, they may be of the pressed type wherein the walls 6 and 7 are of single thickness of metal, or they may be of any other construction.

Figure 2:
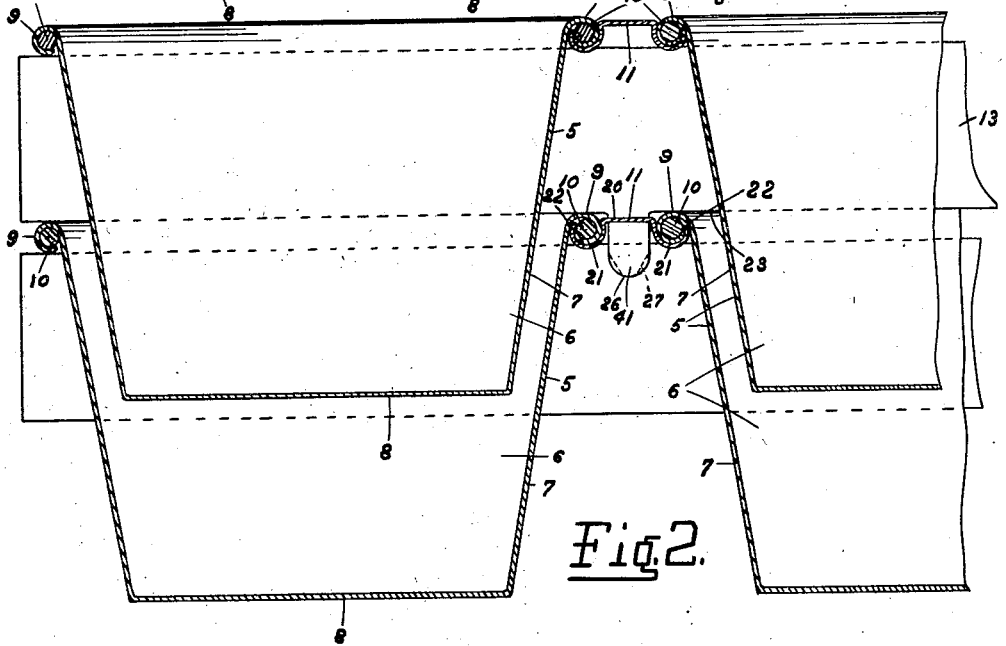
Fig. 2 is an enlarged cross-sectional view taken longitudinally of the nested pan units shown in Fig. 1.

The pans are connected so as to maintain a predetermined spaced relationship, by means of the spacers 11 and side rails 12 and 13. The longitudinal side rails contact the folds 14 of the pan ends and are secured to the folds in any suitable manner, such as by providing perforations 15 in the rails, with tongues 16 extending thereinto and adapted to clamp the folds upon the rails. The tongues 16 are disposed between the folds and the end wall, as indicated in Fig. 1, and are then pressed upon the folds toward the inner face of the rail, thereby securely clamping the folds upon the rail. Each rail is provided, along its upper edge 17, with an outwardly extending reinforcing bead 18 which is backed by a flat portion 19 lying in the plane of the rail. The flat portion 19 abuts the end walls of the pans, and edge 17 contacts and supports the beads 9 of the end walls (Figs. 1 and 2).

The spacers 11 each comprise a body 20 having curved arms 21 contacting the under portions of the beads and having the ends 22 thereof clamped between the beads 9 and the reinforcing wires or loops 10. The ends of the spacers thereby are securely fastened to adjacent pans and serve to maintain the spaced relationship between the upper edges of adjacent pan sides 7. The spacers 11 do not extend from one side rail to the other, but are disposed intermediate said rails. From the foregoing, it will be readily apparent that a predetermined spaced relationship of adjacent pan sides is provided for.

Upon nesting or stacking the pan units, the longitudinal side rails of the upper pan unit rest upon the tops of the beads 9 of the unit below. Because of the tapering sides and ends of the pans, the pans may be nested, as shown in Fig. 2, without having the outer faces of the superposed pans in contacting relationship with the inner faces of the lowermost unit. It will be noted, however, that the nested units are capable of relative longitudinal movement, and that such movement would cause corresponding outer faces of side walls 7 of the superposed unit to contact the inner faces of walls 7 of the subjacent unit. Such contact is not desirable for the reason that the chafing and impact resulting from handling of the units causes scratching and wearing off of the plating material in the pans, and otherwise damages the side walls. To preclude such relative longitudinal movement of the units when nested, the following means are provided.

Figure 3:
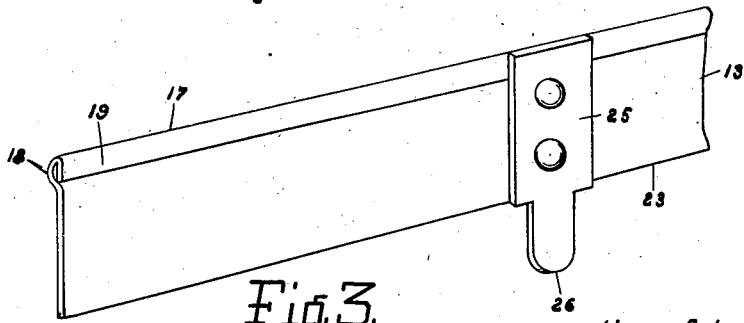
Fig. 3 is an enlarged detail view showing a pan unit rail provided with a spacer finger or stop lug in accordance with the invention.

Depending below the lower edges 23 of the rails are stops or spacer fingers 24, which are adapted to enter the spaces between the adjacent beads 9 of adjacent pan sides 7. These stops or fingers may be integral with the rails, as shown in Fig. 2, or they may be separate members such as 25 riveted or otherwise secured to the rails as in Fig. 3. The lower or free ends of the fingers preferably are rounded as at 26, but may be tapered as indicated by dotted lines 27 (Fig. 2), in order to provide for ready entry into the said spaces between the pan sides. Any number of such fingers may be employed for precluding relative longitudinal movement of the pan units when nested, and it has been found that one on each rail performs the desired function satisfactorily. It will be readily observed that the stop fingers, being disposed without the pan interiors, can in no manner injure the interiors of the pans, and that they preclude contact between the pan sides of the upper and lower pan units, when nested, by limiting relative longitudinal movement of the units.

It is to be understood that various modifications and changes in structural details may be made within the scope of the claims, without departing from the spirit of the invention.

What is claimed is:

1. In combination a plurality of spaced pans secured together to form a unitary structure, side rails connecting the pans, and a stop finger on one of the side rails for entry into the space between pans of a similar unit.

2. In a bake pan unit the combination of a plurality of pans having side and end walls, a rail secured to the corresponding end walls of the pans for maintaining the pans in spaced relationship, spacers connecting the side walls of adjacent pans for precluding variance in the distances between said adjacent walls, and a depending stop finger on the rail disposed midway between the pan sides for entry into the space between similar pans of a similar unit upon nesting the units.

3. In a bake pan unit the combination of a plurality of pans having side and end walls, a rail secured to the corresponding end walls of the pans for maintaining the pans in spaced relationship, spacers connecting the side walls of adjacent pans for precluding variance in the distances between said adjacent walls, and a depending stop finger on the rail and having a free end reduced in width for entry into the space between similar pans of a similar unit upon nesting the units.

4. In a bake pan unit the combination of a plurality of spaced end and intermediate pans secured together to form a unit and adapted to extend into pans of a subjacent similar unit, and means on one of the units extending into engagement with the walls of a recess in the other unit for preventing longitudinal movement of one unit with respect to the other unit.

5. In a bake pan unit the combination of a pluralty of spaced end and intermediate pans secured together to form a unit and adapted to extend into pans of a subjacent similar unit, and means on one of the units extending into engagement with the walls of a recess in the other unit for preventing longitudinal movement of one unit with respect to the other unit, said means being located so as to contact an exterior portion of an inner or intermediate subjacent pan.

In testimony whereof, I have hereunto subscribed my name this 4th day of April, 1930.

HARRY A. LOCKWOOD.